Inventor
Reuben Hill
By S. Jay Tellu
Attorney

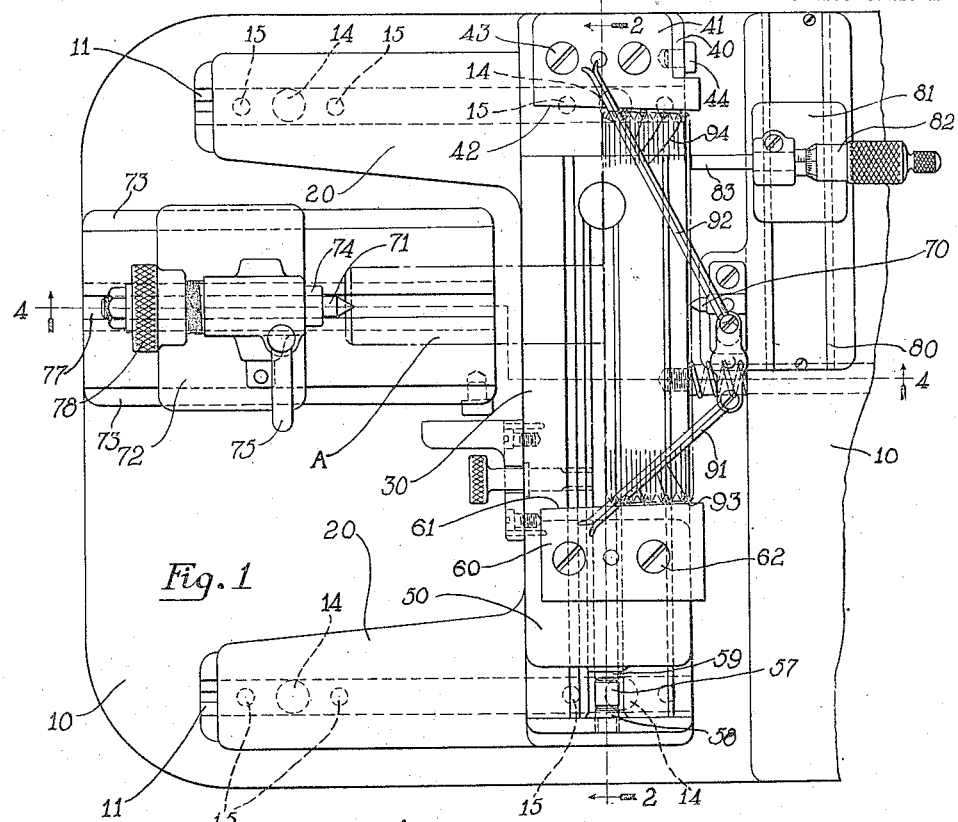
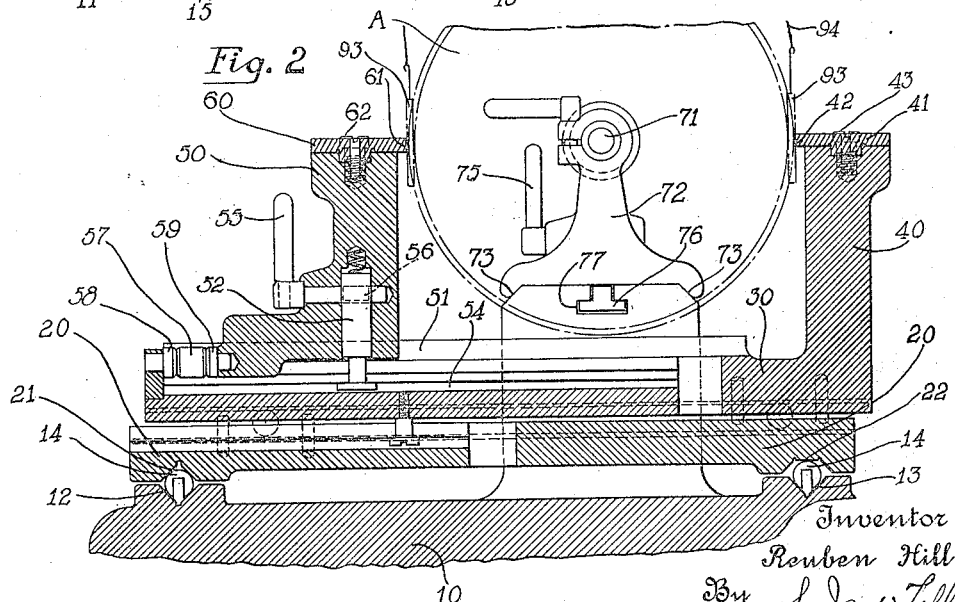

UNITED STATES PATENT OFFICE.

REUBEN HILL, OF HARTFORD, CONNECTICUT, ASSIGNOR TO PRATT & WHITNEY COMPANY, OF NEW YORK, N. Y., A CORPORATION OF NEW JERSEY.

MEASURING MACHINE FOR GAUGES.

1,423,214.  Specification of Letters Patent.  Patented July 18, 1922.

Application filed September 1, 1920. Serial No. 407,398.

*To all whom it may concern:*

Be it known that I, REUBEN HILL, a citizen of the United States, residing at Hartford, in the county of Hartford and State of Connecticut, have invented certain new and useful Improvements in Measuring Machines for Gauges, of which the following is a specification.

This invention relates to a linear measuring machine for determining the dimensions of tapered plug gauges. The gauge or other tapered or conical body may have a plane conical surface on its periphery or a screw threaded surface. Particularly, the invention relates to a device for determining the angle of the taper and the diameters of a tapered or conical screw thread plug gauge.

An object of the invention is to provide a convenient device or mechanism to determine the accuracy of a tapered screw threaded gauge when compared with a standard gauge of the same type, or to determine the actual diameters of different tapered or conical screw threaded bodies. One of the features of the invention is that the measurements are taken along the length of the gauge with contact members engaging the flanks of the screw threads.

With these and other objects in view my invention consists in the features of construction and operation set forth in the following specification and illustrated in the accompanying drawings.

In the accompanying drawings annexed hereto and forming a part of this specification, I have shown my invention embodied as a part of a complete testing machine for tapered screw threaded gauges but it will be understood that the invention can be otherwise embodied and that the drawings are not to be construed as defining or limiting the scope of the invention, the claims appended to this specification being relied upon for that purpose.

In the drawings:

Figure 1 is a plan view of the device.

Fig. 2 is a sectional view in elevation taken along the line 2—2 of Fig. 1.

Figure 3:
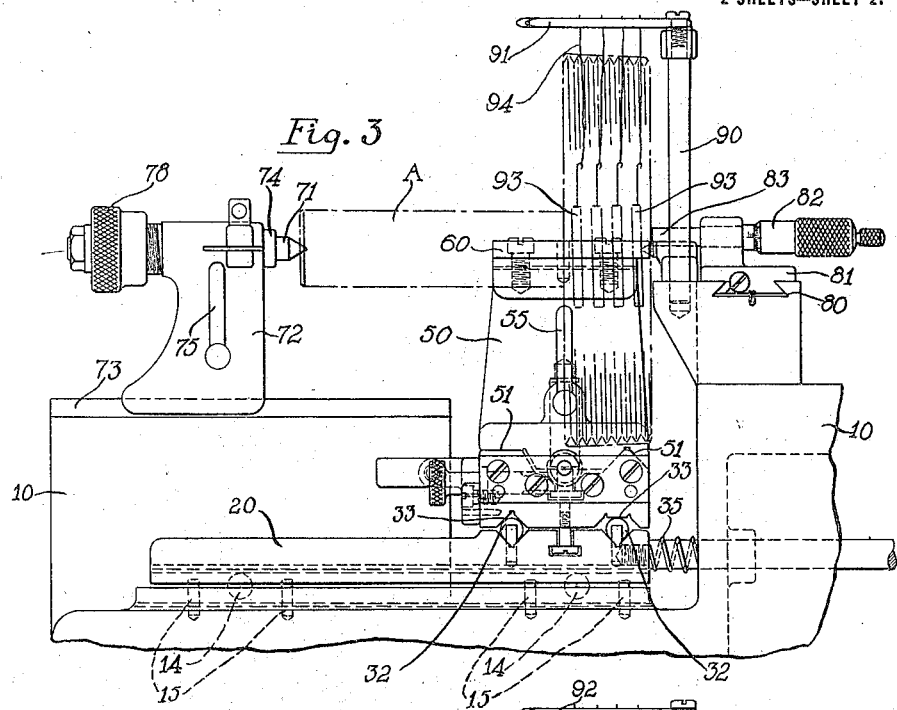
Fig. 3 is a front elevation.
Figure 4:
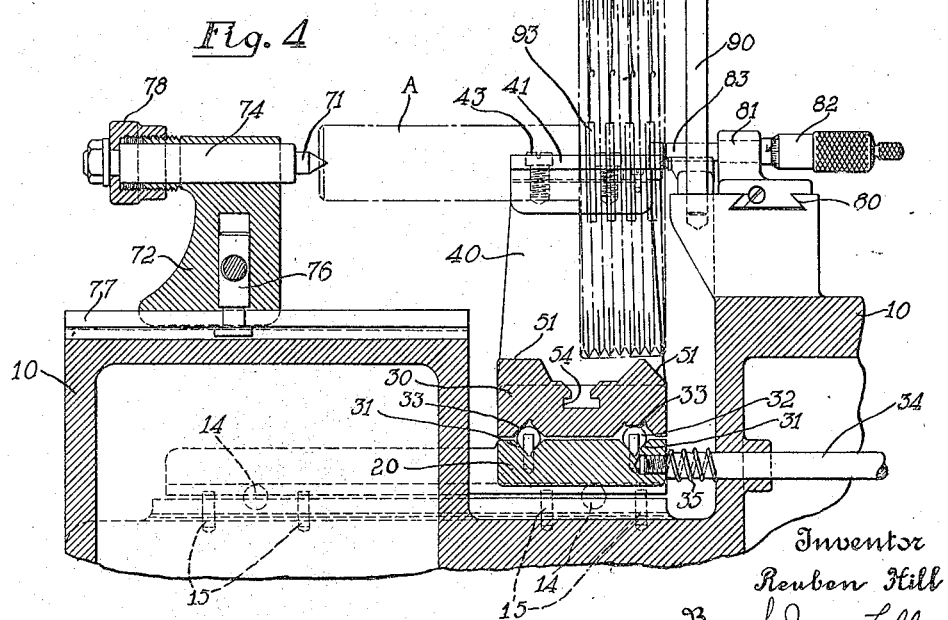
Fig. 4 is a section taken on line 4—4 of Fig. 1.

Briefly, my invention in its broadest aspect comprises the following principal parts: first, a base which may be suitably supported on a pedestal and having its upper surface provided with suitable guideways for the movable parts; second, a slidable carriage mounted to slide in two directions at right angles to each other in a horizontal plane and adapted to support the gauge contacting parts of a measuring device; third, means for mounting the gauge to be measured; fourth, contact devices mounted on the movable carriage adapted to engage the gauge when measurements are being taken; and fifth, an adjustabe stop for determining the axial position of the gauge relative to the carriage when the device is in measuring position.

This application contains subject matter also shown in my application for lead measuring machine for gauge, Serial No. 407,396, filed on even date herewith.

Referring more in detail to the figures of the drawing, the machine is shown arranged for determining the taper and diameters of a Briggs standard thread gauge shown at A. At 10 is shown a base provided with suitable guideway 11. These guideways, as shown clearly in Fig. 2, preferably take the form of V's 12 and 13 respectively at the forward and rearward part of the base. Within the V's 12 and 13 are located balls 14 preferably placed between stop pins 15 so that the balls 14 may have a limited free travel, the stop pins 15 serving to prevent the balls 14 from sliding from the base 10. Resting on the balls 14 in these V's 12 and 13 is a saddle 20. This, as shown, has an inverted V guideway 21 corresponding to the V 12 at the forward end of the base and a plane surface guideway 22 contacting with the balls 14 in the guideway 13 at the rearward end of the base 10. It will be seen from the above that the guideways 12 and 13 on the base 10, the guideways 21 and 22 on the saddle 20 and balls 14 provide an antifriction bearing for the saddle 20 enabling the saddle to slide to the left or right a limited distance with a minimum of friction.

On the saddle 20 slides a carriage 30 adapted to slide forward and rearward, that is, at right angles relative to the movement of the saddle 20. In order to accomplish this I provide parallel guideways 31 in the upper surface of the saddle 20 in which balls 32 are adapted to slide. Resting on these balls in suitable guideways 33 in its lower surface is the carriage 30. Thus, the carriage 30 may slide a limited distance with a minimum of friction forward and rearward on the saddle 20. By means of the two sets of guideways located at right angles to each other the carriage 30 may slide in any direction with a minimum of friction by sliding upon one guideway or the other.

To control the left and right movement of the carriage 30 and the saddle 20, I provide a rod 34 suitably fastened into one side of the saddle 20. Between the saddle 20 and a part of the base 10 is a light spring 35 which may preferably surround the rod 34.

Any convenient means (not shown) may be used to position and adjust the rod 34 so that the saddle 20 may be drawn to the right or allowed to move to the left by expansion of spring 35.

At the rear of carriage 30 is an upright 40 on the top surface of which rests a plate 41, the forward surface 42 of this plate 41 is suitably bevelled to correspond with the taper of the gauge or other specimen being examined. The plate 41 is secured in fixed position on the upright 40 by screws such as those shown at 43.

Adjacent the plate 41 and permanently mounted on the uprights 40 of carriage 30 is a contact plug 44. This is located on one side of the upright 40 and is adapted to be engaged by the micrometer presently to be described.

At the forward part of the carriage 30 is a support 50 slidable forward and backward along ways 51 formed in the upper surface of the carriage 30. The support 50 is adapted to be locked in any adjusted position on the carriage 30 by means of a T-headed bolt 52 engaging a T-slot 54 in the carriage 30. The bolt 52 may be conveniently tightened or loosened by handle 55 which, by means of an eccentric surface 56 slightly raises and lowers the bolt 52 relative to the support 50.

To accurately position the support 50 longitudinally on the carriage 30 I provide a distance piece 57 adapted to fit between a surfaced plug 58 at the forward end of carriage 30 and a corresponding surfaced plug 59 on the support 50. A plurality of these distance pieces 57 are provided of varying lengths to provide means to set the support 50 in adjusted positions to accommodate different sizes of gauges.

On the upper surface of support 50 is a plate 60, the rearward surface 61 of which is bevelled to correspond to the taper of the gauge or other article being tested and lies diametrically opposite the plate 41 previously mentioned. The plate 60 is secured in fixed position on the support 50 by screws 62.

Fixed to the base 10 at an elevation corresponding to the plates 41 and 60 is a fixed center 70 preferably directly secured to base 10 and in alignment with this center 70 is an adjustable center 71. The adjustable center 71 is preferably mounted in a movable tailstock 72 slidable on suitable ways 73 and adapted to be secured in any adjusted position along the ways 72 by means of a handle 75 which locks the T-headed bolt 76 against tailstock 72. As shown in Fig. 2, the locking bolt 76 engages a T-shaped slot 77 formed in the base 10. Preferably center 71 is mounted in a plunger 74 which may be moved axially relative to tailstock 72 by means of the knurled cap 78.

As shown in the drawings, the axis of the centers 70 and 71 is parallel to the ways 73 and also parallel with the ways 12 and 13 on the base 10. The gauge under examination may be mounted on centers 70 and 71 and fixed thereon by movement of the tailstock 72 and adjustment of the tailstock plunger 74.

Adjacent the fixed center 70 on the base 10 is a guideway 80 extending at right angles to the axis of the centers 70 and 71. In this guideway 80 is adapted to slide a mounting 81 carrying a micrometer head 82 having a contact anvil 83.

Conveniently mounted on a fixed part of the device above described is a support 90 at the upper end of which are mounted adjustable arms 91 and 92. Arms 91 and 92 are preferably made of thin resilient metal strips between which contact rods 93 may be hung in adjusted position by means of threads 94. A plurality of cylindrical rods 93 are used preferably between adjacent convolutions of the threads. A number of different sizes of these rods 93 are also provided so that different sizes of threads may be examined.

Coming now to a description of the method of operation of the above described device, the gauge A to be examined is mounted on centers 70 and 71 and the center 71 fixed in adjusted position so that the gauge (as shown at A) is held firmly in position.

A distance piece 57 is then inserted between the surfaces 58 and 59 and the support 50 locked in position on carriage 30 by means of the handle 55. The distance piece 57 is selected having exactly the proper length for the particular gauge under examination so that with this distance piece 57 placed in position the plates 41 and 60 are at a predetermined distance apart dependent upon the dimensions of the gauge tested. Then the saddle 20 and carriage 30 are moved to the right either by hand or by operation of the rod 34. With carriage 30 in this position the contact rods 93 are placed in position and the carriage 30 moved to the left by movement of the rod 34 and the expansion of spring 35. This movement of carriage 30 causes the rods 93 to come into contact with the bevelled edges 42 and 61 respectively on plates 41 and 60.

With the plates 41 and 60 in contact with the surfaces of the gauge a reading of the micrometer head 82 is taken with the contact anvil 83 first in contact with the forward face of gauge A as shown in Fig. 1, and then in contact with the plug 44 located on the carriage 30. A comparison of these micrometer readings gives a value from which the diameters of the gauge may be determined. These readings of the micrometer head 82 may be repeated with different diameters of rods 93 in place which will give values for the diameters at different points on the flanks of the screw threads.

Also, the device may be used as a comparator by first taking readings of the micrometer head 82 with a known standard gauge in place on the centers 70 and 71 and then with the same distance piece 57 and rods 93 taking measurements with the gauge to be examined, a comparison of the readings determining the variations of the gauge to be tested from the known standard.

If it is desired to measure a plain tapered plug, that is, one without screw threads on its surface, it is only necessary to dispense with the contact members 93. The measurements would then be taken with the plates 41 and 60 directly in contact with the gauge.

What I claim is:

1. A machine for determining the dimensions of a conical body comprising in combination, a base, a mounting on said base for the conical body, a carriage on said base movable in a plane parallel to the axis of said body, a plate fixed to said carriage and adapted to be applied adjacent said body, a support on said carriage movable toward and away from said body, a plate on said support adapted to be applied adjacent said body, and means for determining the relative position of said plates.

2. A device for determining the dimensions of a conical body comprising in combination, a base, a mounting on said base for the conical body, a carriage on said base movable in a plane parallel to the axis of said base, a plate having one of its edges corresponding to the angle of the conical body fixed to said carriage and adapted to be applied adjacent said body, a support on said carriage movable toward and away from said body, a plate having one of its edges corresponding to the angle of the conical body on said support adapted to be applied adjacent said body, and means for determining the relative position of said plates.

3. A machine for determining the dimensions of a conical body comprising in combination, a base, a mounting on said base for the conical body, a carriage in said base movable in a plane parallel to the axis of said body, a plate fixed to said carriage and adapted to be applied adjacent said body, a support on said carriage movable toward and away from said body, a plate on said support adapted to be applied adjacent said body diametrically opposite said first mentioned plate, and means for determining the relative position of said plates.

4. A machine for determining the dimensions of a conical body comprising in combination, a base, a mounting on said base for the conical body, a carriage on said base transversely to the axis of said body in a plane parallel to the axis thereof, a plate fixed to said carriage and adapted to be applied adjacent said body, a support on said carriage movable toward and away from said body, a plate on said support adapted to be applied adjacent said body, and means for determining the relative position of said plates.

5. A machine for determining the dimensions of a conical body comprising in combination, a base, a mounting on said base for the conical body, a carriage on said base transversely to the axis of said body in a plane parallel to the axis thereof, a plate fixed to said carriage and adapted to be applied adjacent said body, a support on said carriage movable toward and away from said body, a plate on said support adapted to be applied adjacent said body diametrically opposite said first mentioned plate, and means for determining the relative position of said plates.

6. A machine for determining the dimensions of a conical body comprising in combination, a base, a mounting on said base for the conical body, a carriage on said base movable in all directions in a plane parallel to the axis of said body, a plate fixed to said carriage and adapted to be applied adjacent said body, a support on said carriage movable toward and away from said body, a plate on said support adapted to be applied adjacent said body, and means for determining the relative position of said plates.

7. A machine for determining the dimensions of a conical body comprising in combination, a base, a mounting on said base for the conical body, a carriage on said base movable in a plane parallel to the axis of said body, a plate fixed to said carriage and adapted to be applied adjacent said body, a support on said carriage movable toward and away from said body, a plate on said support adapted to be applied adjacent said body, a stop on the mounting for said conical body adapted to engage one of the faces of said body, and means for determining the relative position of said plates.

8. A machine for determining the dimensions of a conical body comprising in combination, a base, a mounting on said base for the conical body, a carriage on said base movable in a plane parallel to the axis of said body, a plate fixed to said carriage and adapted to be applied adjacent said body, a support on said carriage movable toward and away from said body, a plate on said support adapted to be applied adjacent said body and gaging means between a fixed point on said carriage and said support for determining the relative position of said plates.

9. A machine for determining the dimensions of a threaded conical body comprising in combination, a base, a mounting on said base for the threaded body, a carriage on said base movable in a plane parallel to the axis of said threaded body, a plate fixed to said carriage adapted to be applied adjacent said threaded body, a support on said carriage movable toward and away from said threaded body, a plate on said support adapted to be applied adjacent said threaded body, a plurality of cylindrical rods interposed between said plates and said threaded body, and means to determine the relative position of said plates.

10. A device for determining the dimensions of a threaded conical body comprising in combination, a base, a mounting on said base for the threaded body, a carriage on said base movable in a plane parallel to the axis of said threaded body, a plate having one of its edges corresponding to the taper angle of the threaded body fixed to said carriage and adapted to be applied adjacent said threaded body, a support on said carriage movable toward and away from said threaded body, a plate having one of its edges corresponding to the taper angle of the threaded body on said support adapted to be applied adjacent said threaded body, a plurality of cylindrical rods interposed between said plates and said threaded body, and means to determine the relative position of said plates.

11. A machine for determining the dimensions of a threaded conical body comprising in combination, a base, a mounting on said base for the threaded body, a carriage on said base movable in a plane parallel to the axis of said threaded body, a plate fixed to said carriage adapted to be applied adjacent said threaded body, a support on said carriage movable toward and away from said threaded body, a plate on said support adapted to be applied adjacent said threaded body diametrically opposite said first mentioned plate, a plurality of cylindrical rods interposed between said plates and said threaded body, and means to determine the relative position of said plates.

12. A machine for determining the dimensions of a threaded conical body comprising in combination, a base, a mounting on said base for the threaded body, a carriage on said base movable in all directions in a plane parallel to the axis of said threaded body, a plate fixed to said carriage adapted to be applied adjacent said threaded body, a support on said carriage movable toward and away from said threaded body, a plate on said support adapted to be applied adjacent said threaded body diametrically opposite said first mentioned plate, a plurality of cylindrical rods interposed between said plates and said threaded body, and means to determine the relative position of said plates.

13. A machine for determining the dimensions of a threaded conical body comprising in combination, a base, a mounting on said base for the threaded body, a carriage on said base movable in a plane parallel to the axis of said threaded body, a plate fixed to said carriage adapted to be applied adjacent said threaded body, a support on said carriage movable toward and away from said threaded body, a plate on said support adapted to be applied adjacent said threaded body, a stop on said mounting for said threaded body adapted to engage one of the faces of said body, a plurality of cylindrical rods interposed between said plates and said threaded body, and means to determine the relative position of said plates.

14. A machine for determining the dimensions of a threaded conical body comprising in combination, a base, a mounting on said base for the threaded body, a carriage on said base movable in a plane parallel to the axis of said threaded body, a plate fixed to said carriage adapted to be applied adjacent said threaded body, a support on said carriage movable toward and away from said threaded body, a plate on said support adapted to be applied adjacent said threaded body, a plurality of cylindrical rods interposed between said plates and said threaded body, and gaging means between a fixed point on said carriage and said support to determine the relative position of said plates.

15. A machine for determining the dimensions of a threaded conical body comprising in combination, a base, a mounting on said base for the threaded body, a carriage on said base movable in all directions in a plane parallel to the axis of said threaded body, a plate fixed to said carriage adapted to be applied adjacent said threaded body, a support on said carriage movable toward and away from said threaded body, a plate on said support adapted to be applied adjacent said threaded body, a plurality of cylindrical rods of equal diameter interposed between said plates and said threaded body, and gaging means between a fixed point on said carriage and said support to determine the relative position of said plates.

In testimony whereof, I hereto affix my signature.

REUBEN HILL.